US006251812B1

United States Patent
Koyama et al.

(10) Patent No.: US 6,251,812 B1
(45) Date of Patent: Jun. 26, 2001

(54) GLASS COMPOSITION AND SUBSTRATE FOR INFORMATION RECORDING MEDIA COMPRISING THE SAME

(75) Inventors: Akihiro Koyama; Shoichi Kishimoto; Junji Kurachi; Nobuyuki Yamamoto, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/293,989

(22) Filed: Apr. 19, 1999

(30) Foreign Application Priority Data

Apr. 17, 1998 (JP) ................................................ 10-124307

(51) Int. Cl.[7] ........................... C03C 3/085; C03C 3/087; B32B 17/00
(52) U.S. Cl. ................................ 501/69; 501/70; 501/72; 428/64.2; 428/65.3; 428/65.6
(58) Field of Search ............................... 501/69, 70, 72; 428/64.1, 64.2, 64.3, 65.3, 65.6, 426, 410, 694 ST

(56) References Cited

U.S. PATENT DOCUMENTS

| 3,368,712 | * | 2/1968 | Sanford et al. | 501/70 |
| 3,454,386 | * | 7/1969 | Ernsberger et al. | 501/69 |
| 3,998,617 | * | 12/1976 | Gliemeroth | 501/69 |
| 4,113,904 | * | 9/1978 | Kiefer | 501/69 |
| 5,618,763 | * | 4/1997 | Frank et al. | 501/69 |
| 5,900,296 | * | 5/1999 | Hayashi et al. | 501/69 |
| 5,902,665 | * | 5/1999 | Kuroda et al. | 501/69 |
| 5,997,977 | * | 12/1999 | Zou et al. | 428/64.1 |

FOREIGN PATENT DOCUMENTS 10-194788 * 7/1998 (JP).
10-194789 * 7/1998 (JP).

* cited by examiner

Primary Examiner—David R. Sample
(74) Attorney, Agent, or Firm—Sughrue, Mion, Zinn, Macpeak & Seas, PLLC

(57) ABSTRACT

A glass composition is disclosed which has a high modulus of elasticity (Young's modulus) and a high rigidity (modulus of elasticity/specific gravity) and is capable of being effectively inhibited from bending or vibrating. Also disclosed is a substrate for information recording media, which comprises the glass composition. The glass composition comprises the following components in terms of mol %: 50 to 64% $SiO_2$, 6 to 18% $Al_2O_3$, 7 to 15% $Li_2O$, 3 to 12% $Na_2O$, 0 to 2% $K_2O$, 0 to 10% $TiO_2$, 0 to 4% $ZrO_2$, 0 to 6% MgO, 0 to 9% CaO, and 0 to 6% SrO, provided at the content of RO (RO=MgO+CaO+SrO) is from 2 to 15%.

4 Claims, No Drawings

GLASS COMPOSITION AND SUBSTRATE FOR INFORMATION RECORDING MEDIA COMPRISING THE SAME

FIELD OF THE INVENTION

The present invention relates to a high-modulus glass composition. More particularly, this invention relates to a glass composition suitable for use as a substrate for information recording media, which is required to have excellent surface smoothness and a high modulus. The present invention further relates to a substrate for information recording media, which comprises the glass composition, and to an information recording medium.

BACKGROUND OF THE INVENTION

Information recording devices such as magnetic disks are always required to have a larger recording capacity and to attain a reduction in access time such as disk rotational delay. One possible means for satisfying the latter requirement is to heighten the rotational speed of a medium.

However, the media comprising a substrate currently in use are weighed down by themselves and resonate considerably at an increased rotational speed. Eventually, the surface of such a medium comes into contact with the head to cause an error or crushing. It is therefore impossible to narrow the gap between the magnetic disk head and the recording medium to or below a certain level, and this constitutes a serious obstacle to an increase in recording capacity.

For reducing the bending of a substrate medium and diminishing the resonance of the medium being rotated, it is necessary to heighten both the modulus of elasticity (Young's modulus) of the substrate of the medium and the rigidity thereof which is the value obtained by dividing the modulus of elasticity by the specific gravity.

The aluminum alloy which has been most commonly used as the substrates of magnetic disks has a modulus of elasticity of 71 GPa and a rigidity of 26 GPa·cm$^3$/g. This conventional substrate material, having such properties, hardly copes with the trend toward higher rotational speeds of 10,000 rpm and above. In addition, it has become necessary to increase the thickness of substrates made of the above material, although this goes against the current trend toward thickness reduction in disk substrates for device miniaturization.

In contrast, substrates made of a tempered glass are superior to the aluminum substrate in both modulus of elasticity and specific gravity. For example, a glass substrate obtained by subjecting a commercially available soda-lime glass to ion exchange in a molten potassium salt is on the market. This substrate has a modulus of elasticity of 72 GPa and a rigidity of 29 GPa·cm$^3$/g.

Also known besides the above one is a glass substrate obtained by tempering commercially available Corning 0317. Although this substrate has a modulus of elasticity of 72 GPa and a rigidity of 29 GPa·cm$^3$/g, these properties are still insufficient.

A high-rigidity substrate for information recording media which is made of a material other than tempered glasses is on the market. This substrate comprises a crystallized glass having a modulus of elasticity of 90 GPa and a rigidity of 38 GPa·cm$^3$/g. However, this substrate, after polishing, inevitably has residual crystal grains projecting from the surface because of the nature of the production process in which crystals are precipitated inside. Namely, this crystallized-glass substrate has a drawback that it is inferior in surface smoothness to the substrates made of a tempered glass.

Consequently, in view of the expected future trend toward even higher rotational speeds in information recording devices and smaller thickness in disk substrates, there is a desire for a glass composition which has further improved properties, i.e., which has a high Young's modulus and a high rigidity, can be easily tempered, and gives a substrate having high surface smoothness through polishing.

SUMMARY OF THE INVENTION

Accordingly, one object of the present invention is to provide a glass composition which has a high modulus of elasticity (Young's modulus) and a high rigidity (modulus of elasticity/specific gravity) and is capable of being effectively inhibited from bending or vibrating when used as the substrate of an information recording medium.

Another object of the present invention is to provide a substrate for information recording media, which comprises the glass composition.

The present invention has been achieved in view of the above-described problems of prior art techniques and the above-described requirements.

The present invention provides a glass composition comprising the following components in terms of mol %: 50 to 64% SiO$_2$, 6 to 18% Al$_2$O$_3$, 7 to 15% Li$_2$O, 3 to 12% Na$_2$O, 0 to 2% K$_2$O, 0 to 10% TiO$_2$, 0 to 4% ZrO$_2$, 0 to 6% MgO, 0 to 9% CaO, and 0 to 6% SrO, provided that the content of RO (RO =MgO +CaO +SrO) is from 2 to 15%.

The glass composition preferably comprises the following components in terms of mol %: 50 to 62% SiO$_2$, 7 to 13% Al$_2$O$_3$, 8 to 13% Li$_2$O, 5 to 10% Na$_2$O, 0 to 5% TiO$_2$, 0 to 2% ZrO$_2$, 2 to 5% MgO, 3 to 9% CaO, and 0 to 6% SrO, provided that the content of RO (RO=MgO+CaO+SrO) is from 5 to 15%.

The glass composition preferably has a rigidity as defined by (Young's modulus)/(specific gravity) of 30 GPa·cm$^3$/g or higher and a modulus of elasticity as represented by Young's modulus of 90 GPa or higher.

Furthermore, the glass composition is preferably one which has undergone an ion exchange treatment in at least one molten salt containing ions of potassium, sodium, or both.

The present invention further provides a substrate for information recording media, which comprises the above-described glass composition which has undergone the ion exchange treatment.

This invention still further provides an information recording medium containing the substrate.

DETAILED DESCRIPTION OF THE INVENTION

The reasons for limitations of the components of the high-rigidity high-modulus glass composition of the present invention are explained below. Hereinafter, unless otherwise indicated, all percents are by mole.

SiO$_2$ is the main component constituting the glass. If the proportion of SiO$_2$ is lower than 50%, the glass has impaired chemical durability. On the other hand, if the proportion thereof exceeds 64%, the desired modulus of elasticity is not obtained. Consequently, the proportion of SiO$_2$ should be from 50 to 64%, and is preferably from 50 to 62%.

Al$_2$O$_3$ is an ingredient which improves the modulus of elasticity and rigidity of the glass and increases the depth of a compression stress layer formed by ion exchange. Al$_2$O$_3$ further serves to improve the water resistance of the glass. If the proportion of Al$_2$O$_3$ is lower than 6%, these effects are insufficient. On the other hand, if the proportion thereof exceeds 18%, the results are an increased viscosity, an increase in liquidus temperature which is severer than the viscosity increase, and impaired meltability. Consequently, the proportion of $Al_2O_3$ should be from 6 to 18%, and is preferably from 7 to 13%.

$Li_2O$, which is an ingredient to be replaced in ion exchange, serves to improve the modulus of elasticity and rigidity of the glass and to lower the melting temperature of the glass to thereby enhance its meltability. If the proportion of $Li_2O$ is lower than 7%, rigidity is insufficient. On the other hand, if the proportion thereof exceeds 15%, the substrate has impaired weatherability and impaired acid resistance. Consequently, the proportion of $Li_2O$ should be from 7 to 15%, and is preferably from 8 to 13%.

$Na_2O$, which is an ingredient to be replaced in ion exchange, serves to lower the melting temperature and the liquidus temperature to thereby enhance meltability. If the proportion of $Na_2O$ is lower than 3%, these effects are insufficient. On the other hand, if the proportion thereof exceeds 12%, weatherability and acid resistance are impaired. Consequently, the proportion of $Na_2O$ should be from 3 to 12%, and is preferably from 5 to 10%.

$K_2O$ is an optional ingredient which enhances meltability. However, $K_2O$ not only impairs weatherability when contained in an amount exceeding 2%, but is highly effective in lowering the Young's modulus. Consequently, the proportion of $K_2O$ is preferably not higher than 0.1%, which is an allowable limit of the amount of $K_2O$ which can come into the glass as an impurity. More preferably, the glass contains substantially no $K_2O$.

$TiO_2$ is an ingredient which improves the modulus of elasticity, rigidity, and weatherability of the glass. However, if the proportion thereof exceeds 10%, the glass has an elevated liquidus temperature and impaired devitrification resistance. Consequently, the proportion of $TiO_2$ should be 10% or lower, and is preferably 5% or lower.

$ZrO_2$ is an ingredient which improves the modulus of elasticity, rigidity, and weatherability of the glass. However, if the proportion of $ZrO_2$ exceeds 4%, the glass has an elevated liquidus temperature and impaired devitrification resistance. Furthermore, if the proportion thereof exceeds 2%, there is a high possibility that fine crystals might precipitate in the molten glass. Consequently, the proportion of $ZrO_2$ should be 4% or lower, and is preferably 2% or lower.

MgO is an ingredient which heightens the modulus of elasticity, rigidity, and meltability of the glass. However, if the proportion of MgO exceeds 6%, the glass has an elevated liquidus temperature and impaired devitrification resistance. Consequently, the proportion of MgO should be 6% or lower, and is preferably from 2 to 5%.

CaO is an ingredient which heightens the modulus of elasticity, rigidity, and meltability of the glass. However, if the proportion of CaO exceeds 9%, the glass has an elevated liquidus temperature and impaired devitrification resistance. Consequently, the proportion of CaO should be 9% or lower, and is preferably from 3 to 9%.

SrO is an ingredient which heightens the modulus of elasticity and meltability of the glass. However, if the glass contains SrO in a large amount, it disadvantageously has an increased specific gravity. Consequently, the proportion of SrO should be 6% or lower.

If the total amount of MgO, CaO, and SrO (i.e., the amount of RO) is below 2%, the glass is insufficient in modulus of elasticity, rigidity, and meltability. If the total amount thereof exceeds 15%, the glass has an elevated liquidus temperature and impaired devitrification resistance. Consequently, the total amount of RO should be from 2 to 15%, and is preferably from 5 to 15% from the standpoint of high modulus.

Besides the ingredients described above, other ingredients may be added in a total amount of up to 3% for the purposes of coloring, melt clarification, etc. Examples of such optional ingredients include $As_2O_3$, $Sb_2O_3$, $SO_3$, $SnO_2$, $Fe_2O_3$, CoO, Cl, and F.

For molding the glass composition of the present invention, use may be made of molding techniques such as, e.g., pressing, down-draw, and float processes without particular limitations. However, a float process is optimal from the standpoints of quality and cost, because it can produce a highly flat glass plate.

This glass composition, which contains $Li_2O$ and $Na_2O$, can be easily made to have an increased fracture strength by immersing the composition in at least one molten salt containing ions of potassium, sodium, or both at a temperature not higher than the distortion point of the glass composition to thereby interchange these ions and thus generate a compression stress on the surfaces of the composition.

When this glass composition is used as a substrate for information recording media, this substrate is less apt to bend or suffer resonant vibration because it has a higher modulus of elasticity and a higher rigidity than conventional substrates. Therefore, the recording medium employing this glass composition is especially suitable for use in recording apparatuses of the high rotational speed type.

The present invention will be explained below in more detail by reference to the following Examples. However, the invention should not be construed as being limited to these Examples.

EXAMPLES 1 TO 10

Ten compositions as examples of the glass composition of the present invention are shown in Table 1 together with properties thereof.

TABLE 1

|  | Example | | | | | |
|---|---|---|---|---|---|---|
|  | 1 | 2 | 3 | 4 | 5 | 6 |
| Component (mol %) | | | | | | |
| $SiO_2$ | 57.4 | 54.8 | 54.8 | 52.2 | 56.8 | 57.4 |
| $Al_2O_3$ | 8.0 | 15.6 | 15.6 | 15.6 | 9.9 | 8.0 |
| $Li_2O$ | 8.7 | 11.8 | 11.8 | 10.8 | 10.4 | 8.7 |
| $Na_2O$ | 8.4 | 7.2 | 6.2 | 9.3 | 7.7 | 9.4 |
| $K_2O$ | 0.0 | 0.0 | 1.0 | 0.0 | 0.0 | 0.0 |
| MgO | 4.5 | 4.2 | 3.0 | 4.2 | 4.1 | 2.6 |
| CaO | 5.0 | 6.3 | 4.5 | 6.3 | 6.0 | 5.9 |
| SrO | 5.0 | 0.0 | 3.0 | 0.0 | 2.0 | 5.0 |
| $ZrO_2$ | 0.0 | 0.0 | 0.0 | 0.0 | 0.0 | 0.0 |
| $TiO_2$ | 3.0 | 0.0 | 0.0 | 1.5 | 3.0 | 3.0 |
| $Fe_2O_3$ | 0.0 | 0.0 | 0.0 | 0.0 | 0.0 | 0.0 |
| Specific gravity (g/cm³) | 2.84 | 2.53 | 2.58 | 2.56 | 2.60 | 2.84 |
| Modulus of elasticity (GPa) | 92 | 90 | 90 | 90 | 90 | 91 |
| Rigidity (GPa · cm³/g) | 33 | 36 | 35 | 35 | 34 | 32 |
| Vickers hardness (kg/mm²) | 619 | 643 | 623 | 631 | 669 | 614 |
| Thickness of Compression stress layer (μm) | 51 | 70 | 69 | 72 | 60 | 52 |

|  | Example | | | | Comparative Example | |
|---|---|---|---|---|---|---|
|  | 7 | 8 | 9 | 10 | 1 | 2 |
| Component (mol %) | | | | | | |
| $SiO_2$ | 57.4 | 57.4 | 56.2 | 51.4 | 71.6 | 67.8 |
| $Al_2O_3$ | 8.0 | 8.0 | 8.3 | 15.6 | 0.9 | 10.5 |

TABLE 1-continued

| | | | | | | |
|---|---|---|---|---|---|---|
| Li$_2$O | 8.7 | 8.7 | 9.2 | 11.8 | 0.0 | 0.0 |
| Na$_2$O | 9.4 | 8.4 | 11.3 | 7.2 | 12.7 | 13.1 |
| K$_2$O | 0.0 | 0.0 | 0.0 | 0.0 | 0.5 | 2.3 |
| MgO | 5.0 | 3.9 | 4.0 | 4.2 | 6.0 | 5.2 |
| CaO | 6.5 | 8.6 | 6.0 | 6.3 | 8.4 | 0.5 |
| SrO | 2.0 | 2.0 | 2.0 | 0.0 | 0.0 | 0.0 |
| ZrO$_2$ | 0.0 | 0.0 | 0.0 | 3.0 | 0.0 | 0.0 |
| TiO$_2$ | 3.0 | 3.0 | 3.0 | 0.0 | 0.0 | 0.6 |
| Fe$_2$O$_3$ | 0.0 | 0.0 | 0.0 | 0.3 | 0.0 | 0.0 |
| Specific gravity (g/cm$^3$) | 2.77 | 2.79 | 2.77 | 2.62 | 2.50 | 2.46 |
| Modulus of Elasticity (GPa) | 91 | 92 | 92 | 94 | 72 | 72 |
| Rigidity (GPa · cm$^3$/g) | 33 | 33 | 33 | 36 | 29 | 29 |
| Vickers hardness (kg/mm$^2$) | 615 | 616 | 610 | 652 | 530 | 553 |
| Thickness of Compression Stress layer (μm) | 52 | 51 | 53 | 73 | 11 | 39 |

An explanation is first given on the Examples. Common raw materials for glass including silica, alumina, lithium carbonate, sodium carbonate, basic magnesium carbonate, calcium carbonate, potassium carbonate, strontium carbonate, titania, and zirconia were mixed together to prepare batches as base materials for substrate glasses so that these batches gave compositions respectively having the components shown in Table 1. Each batch prepared was held at 1,550° C. for 4 hours with a platinum crucible and then poured on an iron plate. This glass was held at 650° C. for 30 minutes in an electric furnace. Thereafter, the furnace was switched off to allow the glass to cool to room temperature. Thus, sample glasses were obtained.

The specific gravity, modulus of elasticity (Young's modulus), rigidity (Young's modulus/specific gravity), Vickers hardness, and compression stress layer thickness of each of the sample glasses were measured or calculated in the following manners. The results obtained are shown in Table 1 above.

Modulus of elasticity was determined by the following method.

A sample glass was cut into a piece and each side thereof was subjected to mirror polishing to obtain a platy sample having dimensions of 5×30×30 mm. Each sample was examined for density by the Archimedes method. Furthermore, the modulus of elasticity of each sample was calculated by the ultrasonic method using a sing-around oscillator.

The glasses of Examples 1 to 10 according to the present invention each had a Young's modulus of 90 GPa or higher and a rigidity of 32 GPa·cm$^3$/g or higher.

Subsequently, each sample was examined for Vickers hardness as a measure of impact resistance. The glasses of Examples 1 to 10 according to the present invention were superior to the glasses of the Comparative Examples also in Vickers hardness.

Vickers hardness was measured by the following method.

A glass sample prepared by the same method as in the determination of Young's modulus was examined with a Vickers hardness tester (MVK-G2, manufactured by AKASI Co., Ltd.). An indenter made of diamond was used to impose a load of 200 g on a surface of the sample over 15 seconds to form an indentation thereon. The length of a diagonal of the indentation was measured to obtain the Vickers hardness of the sample.

The glasses of Examples 1 to 10 were then immersed for 1 hour in a melt of an 80:20 salt mixture of KNO$_3$ and NaNO$_3$ heated at 380° C. to conduct tempering. Thereafter, each tempered glass was examined with a polarizing microscope to determine the thickness of the resulting compression stress layer.

In each of the glasses of Examples 1 to 10, a compression stress layer having a thickness of 50 μm or larger had been formed. The components of these glasses thus proved to be suitable for tempering.

APPLICATION EXAMPLE

The sample glass of Example 1 described above was cut into a ring form having an outer diameter of 95 mm and an inner diameter of 25 mm. This disk was ground and polished and subsequently subjected to tempering under the same conditions as the above and then to mirror polishing (surface roughness $R_a \leq 1$ nm; JIS B 0601-1994) to regulate the thickness thereof to 1.0 mm. Thus, a substrate for magnetic recording media was obtained.

Using the thus-produced substrate for magnetic recording media, a magnetic disk medium was produced in the following manner.

Chromium, Co—Cr—Ta, and carbon were deposited on the substrate as an undercoat layer, recording layer, and protective layer, respectively, by sputtering. A lubricating layer was further formed thereon to obtain a magnetic disk medium.

The medium thus obtained was set in a closed type magnetic-disk drive and continuously rotated at each of 10,000 rpm and 12,000 rpm. In either case, the medium was found to be free from troubles such as head crushing caused by substrate vibration, because the glass substrate had a high Young's modulus and a high rigidity.

COMPARATIVE EXAMPLES 1 AND 2

An explanation is given below on Comparative Examples 1 and 2. The compositions of Comparative Examples 1 and 2 are outside the scope of the present invention. In particular, the composition of Comparative Example 1 is a general soda-lime glass composition.

Sample glasses were prepared in the same manner as in the Examples, except the following. In Comparative Example 2, the batch prepared was held at 1,600° C. for 16 hours with a platinum crucible and then poured on an iron plate. This glass was held at 650° C. for 30 minutes in an electric furnace, which was then switched off to allow the glass to cool to room temperature to obtain a sample glass.

The specific gravity, modulus of elasticity (Young's modulus), rigidity (Young's modulus/specific gravity), Vickers hardness, and compression stress layer thickness of each of these sample glasses were measured or calculated in the same manners as in the Examples. The results obtained are shown in Table 1.

However, tempering was conducted in the following manners, as different from that in Examples 1 to 10. In Comparative Example 1, the glass of Comparative Example 1 was immersed for 3 hours in a molten salt of KNO$_3$ heated at 380° C. to conduct tempering. In Comparative Example 2, the glass of Comparative Example 2 was immersed for 16 hours in a molten salt of KNO$_3$ heated at 440° C. to conduct tempering. A section of each of these samples was examined with a polarizing microscope in the same manner as in the Examples to determine the thickness of the resulting compression stress layer.

The glasses of Comparative Examples 1 and 2 each had a Young's modulus lower than 90 GPa and a rigidity lower than 30 GPa cm$^3$/g.

These glasses each had a lower Vickers hardness than the glasses of the Examples. In addition, the compression stress layer in each of the glasses of the Comparative Examples had a thickness below 40 μm, which was far smaller than those in the Examples, despite the higher melt temperature and the longer immersion periods than in the Examples.

As described above in detail, the following effects are brought about by the present invention.

According to the present invention, a glass composition having a higher rigidity and a higher modulus of elasticity than conventional glasses can be obtained.

According to one preferred embodiment of the present invention, a high-rigidity high-modulus glass composition which can be easily produced and has satisfactory weatherability can be obtained because the range of the glass componebt has been narrowed.

According to another preferred embodiment of the present invention, a limited high-rigidity high-modulus glass composition is provided. This glass composition can have a higher rigidity and a higher modulus of elasticity than the conventional glasses and conventional aluminum alloy.

According to still another preferred embodiment of the present invention, tempering is easy and a surface compression stress layer can be formed on the glass composition to a larger depth than on general soda-lime glasses.

According to another embodiment of the present invention, a glass substrate suitable for use as the substrate of an information recording medium can be obtained which comprises the above glass composition and has a high rigidity, a high modulus of elasticity, and a high fracture strength.

According to further embodiment of the present invention, a recording medium employing the above glass substrate having a high rigidity, high modulus of elasticity, and high fracture strength can be obtained. This recording medium can be rotated at a higher speed, bends less, and is less apt to suffer resonant substrate vibration. Hence, the gap between the magnetic disk head and the recording medium can be narrowed, making it possible to attain an increase in storage capacity and a reduction in access time. Therefore, the recording medium employing the glass composition is especially suitable for use in recording apparatuses of the high rotational speed type.

While the invention has been described in detail and with reference to specific embodiments thereof, it will be apparent to one skilled in the art that various changes and modifications can be made therein without departing from the spirit and scope thereof.

What is claimed is:

1. A glass composition consisting essentially of the following components in terms of mol %:

50 to 62% $SiO_2$, 6 to 18% $Al_2O_3$, 7 to 15% $Li_2O$, 3 to 12% $Na_2O$, 0 to 2% $K_2O$, 0 to 10% $TiO_2$, 0 to 4% $ZrO_2$, 0 to 6% MgO, 0 to 9% CaO, and 0 to 6% SrO, provided that the content of RO (RO=MgO+CaO+SrO) is from 2 to 15%, wherein the glass composition has undergone an ion exchange treatment in at least one molten salt containing ions of potassium, sodium, or both;

and, the glass composition having a rigidity as defined by (Young's modulus)/(specific gravity) of 30 Gpa-cm³/g or higher and a modulus of elasticity as represented by Young's modulus of 90 GPa or higher.

2. The glass composition as claimed in claim 1, consisting essentially of the following components in terms of mol %:

50 to 62% $SiO_2$, 7 to 13% $Al_2O_3$, 8 to 13% $Li_2O$, 5 to 10% $Na_2O$, 0 to 5% $TiO_2$, 0 to 2% $ZrO_2$, 2 to 5% MgO, 3 to 9% CaO, and 0 to 6% SrO, provided that the content of RO (RO=MgO+CaO+SrO) is from 5 to 15%.

3. A substrate for information recording media, which comprises a glass composition comprising the following components in terms of mol %:

50 to 64% $SiO_2$, 6 to 18% $Al_2O_3$, 7 to 15% $Li_2O$, 3 to 12% $Na_2O$, 0 to 2% $K_2O$, 0 to 10% $TiO_2$, 0 to 4% $ZrO_2$, 0 to 6% MgO, 0 to 9% CaO, and 0 to 6% SrO, provided that the content of RO (RO=MgO+CaO+SrO) is from 2 to 15%, said glass composition having a rigidity as defined by (Young's modulus)/(specific gravity) of 30 GPa·cm³/g or higher and a modulus of elasticity as represented by Young's modulus of 90 GPa or higher and having undergone an ion exchange treatment in at least one molten salt containing ions of potassium, sodium, or both.

4. An information recording medium using the substrate as claimed in claim 3.

* * * * *